United States Patent Office 3,567,737
Patented Mar. 2, 1971

3,567,737
DERIVATIVES OF [2-CYCLOALKYL-1-PHENYL-3,4-DIHYDRONAPHTHALENES AND] 2 - CYCLOALKYL - 1 - PHENYL - 1,2,3,4-TETRAHYDRONAPHTHALENES
Daniel Lednicer, Kalamazoo, Mich., assignor to The Upjohn Company, Kalamazoo, Mich.
No Drawing. Filed Jan. 2, 1968, Ser. No. 694,811
Int. Cl. C07d 27/02; C07c 37/00
U.S. Cl. 260—326.5
9 Claims

ABSTRACT OF THE DISCLOSURE

Derivatives of 2-cycloalkyl-1-phenyl-3,4-dihydronaphthalenes, cis- and trans-isomers of derivatives of 2-cycloalkyl - 1 - phenyl-1,2,3,4-tetrahydronaphthalene and processes for the preparation of the same. The novel compounds have utility as anti-fertility, estrogenic, anti-estrogenic, anti-spermatogenic, cholesterol lowering and lipid normalizing agents.

BRIEF SUMMARY OF THE INVENTION

The invention relates to novel derivatives of 2-cycloalkyl-1-phenyl-1,2-dihydronaphthalene (I, below) novel derivatives of 2-cycloalkyl-1-phenyl - 1,2,3,4 - tetrahydronaphthalenes (II, below), processes for preparing the same, and novel intermediates prepared by said processes.

The novel compounds of this invention, which includes both the cis- and trans-isomers of the tetrahydronaphthalene derivatives have the formulae:

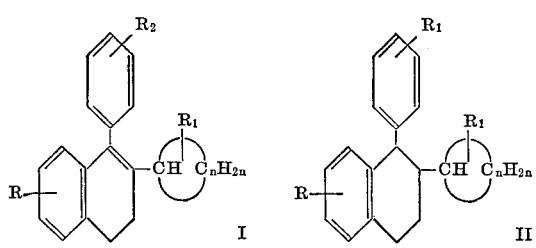

wherein R represents alkoxy and cycloalkoxy; $R_1$ is selected from the class consisting of hydrogen and lower alkyl; and $R_2$ is selected from the class consisting of hydrogen, alkyl, hydroxy, halogen, alkoxy, alkoxy substituted by a group selected from the class consisting of (a) dihydroxyalkyl, having from 2 to 5 carbon atoms, inclusive, (b) a group having the structure

wherein $R_3$ and $R_4$ individually are similar or different alkyl groups and when taken together with the attached nitrogen atom form the residue of a saturated heterocyclic amine containing from 5 to 7 ring members, inclusive, and (c) the radical —$C_mH_{2m}$—$R_5$ wherein $m$ is an integer from 1 to 6, inclusive, and $R_5$ is selected from the group consisting of carboxy and lower carbalkoxy, and $n$ is 4 or 5.

The term "alkyl" means an alkyl radical of from 1 to 4 carbon atoms, inclusive, such as methyl, ethyl, propyl, and butyl, and isomeric forms thereof. The term "halogen" means fluorine, chlorine, bromine and iodine. The term "alkoxy" means alkoxy containing from 1 to 4 carbon atoms, inclusive, such as methoxy, ethoxy, propoxy, and butoxy, and isomeric forms thereof. The term "cycloalkoxy" means cycloalkoxy containing from 3 to 6 carbon atoms, inclusive, such as cyclopropyl cyclobutyl and the like. The term "dihydroxyalkyl from 2 to 5 carbon atoms," is inclusive of 1,2-dihydroxyethyl, 1,3-dihydroxypropyl, 2,3-dihydroxypropyl, 1,4-dihydroxybutyl, 1,3-dihydroxybutyl, and the like. The term "saturated heterocyclic amine containing from 5 to 7 ring atoms" is inclusive of pyrrolidino-, alkylpyrrolidino such as 2-methylpyrrolidino-, 2,2-dimethylpyrrolidino-, 3-methylpyrrolidino and the like; piperazino, alkylpiperazino such as 2-methylpiperazino, 4 - methylpiperazino-, 2,4 - dimethylpiperazino, and the like; piperidino, alkylpiperidino such as 2-methylpiperidino, 3-methylpiperidino, 4,4-dimethylpiperidino, and the like; morpholino, hexamethylenimino, homopiperazino, and the like. The term "carbalkoxy" means the group —COOAlkyl wherein Alkyl is alkyl as hereinbefore defined.

The term "novel compounds of this invention" as used throughout the specification embraces the compounds represented by the Formulae I and II above, including the acid addition salts and quaternary ammonium salts of said compounds wherein the substituent $R_2$ contains a tertiary amino group, and the alkali-metal and alkaline earth metal salts of the compounds of Formulae I and II wherein the substituent $R_2$ represents hydroxy.

The novel processes for making the novel compounds wherein $R_2$ is alkoxy or substituted alkoxy is illustrated in the following equations.

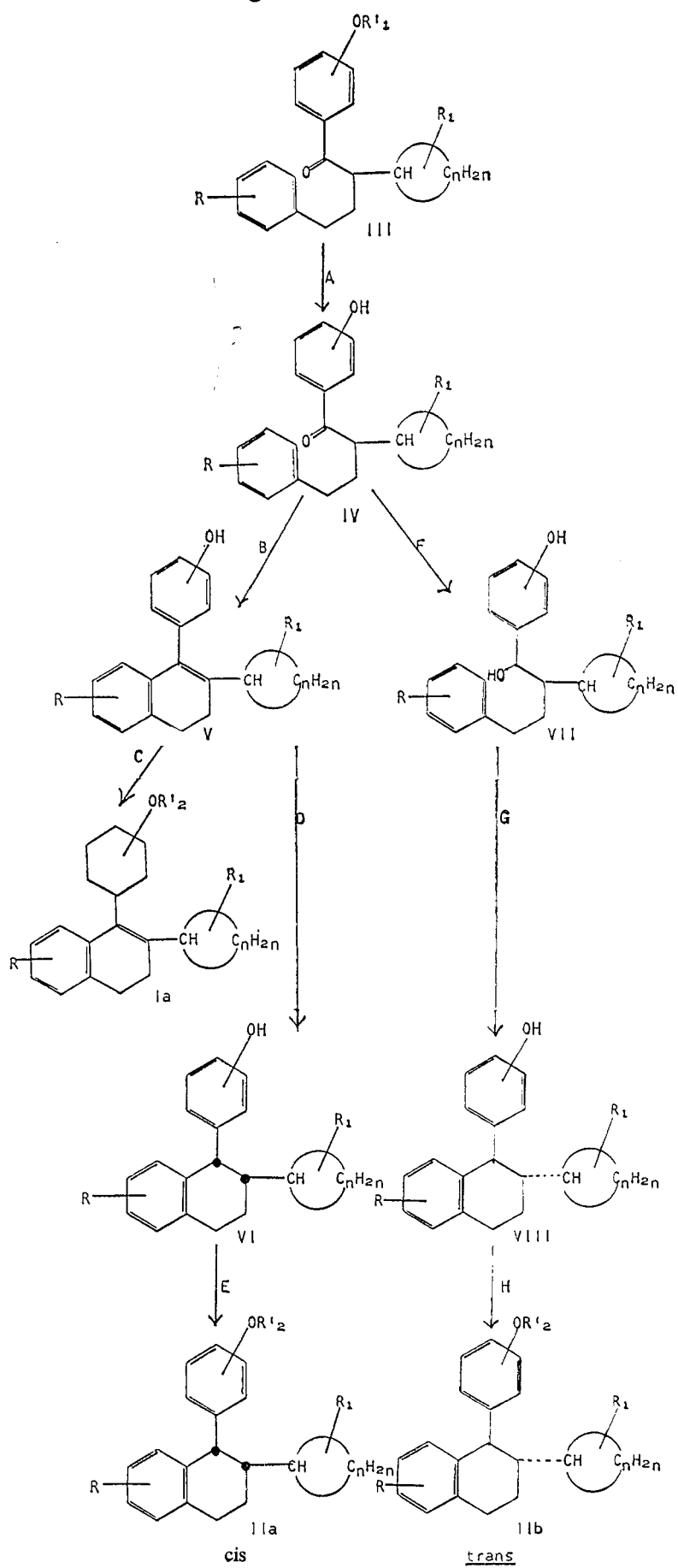

wherein R and $R_1$ are the same as above; $R'_1$ is alkyl, $R'_2$ is alkyl, having from 1 to 4 carbon atoms, inclusive, alkyl substituted by a group selected from the class con- The novel process for making the compounds of Formula I, wherein $R_2$ is other than substituted alkoxy is illustrated in the following equations.

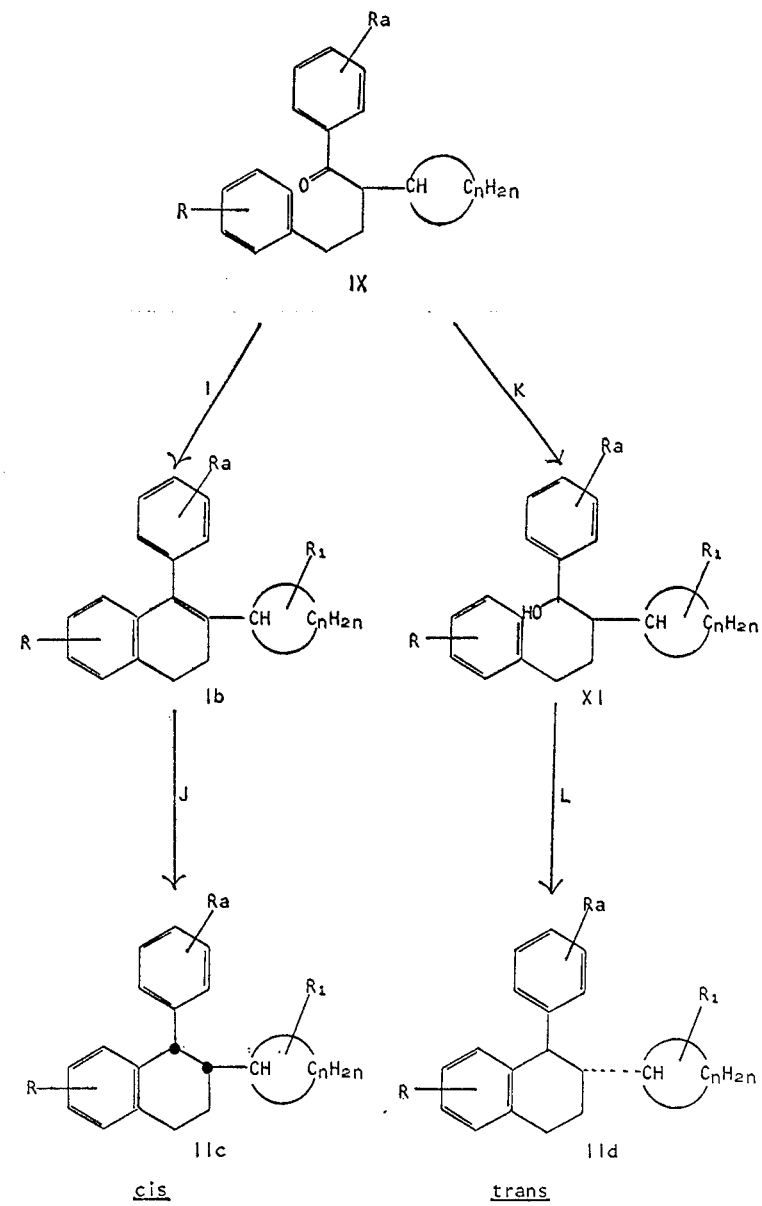

sisting of (a) dihydroxy alkyl having from 2 to 5 carbon atoms, inclusive, (b) a group having the structure

wherein $R_3$ and $R_4$ individually are similar or different alkyl groups and when taken together with the attached nitrogen atom form the residue of a saturated heterocyclic amine containing from 5 to 7 ring members, inclusive, and (c) the radial $-C_mH_{2m}-R_5$ wherein $m$ is an integer from 1 to 6, inclusive, and $R_5$ is selected from the group consisting of carboxy and lower-carbalkoxy; and $n$ is 4 or 5.

wherein $n$, R and $R_1$ are the same as above, and Ra is selected from the group consisting of hydrogen, alkyl, hydroxy or halogen.

DETAILED DESCRIPTION

The starting phenyl substituted 1-butanone Formula III and IX can be prepared by (a) formylating the appropriate phenyl cycloalkylmethyl ketone (b) subjecting the product of the formylation to a modified Wittig reaction to form an unsaturated ketone and (c) catalytically reducing the unsaturated ketone. These steps are illustrated in the following equations:

reduction of the mixture of isomeric olefins (XIVa and XIVb) formed in step (b). It is performed by contacting

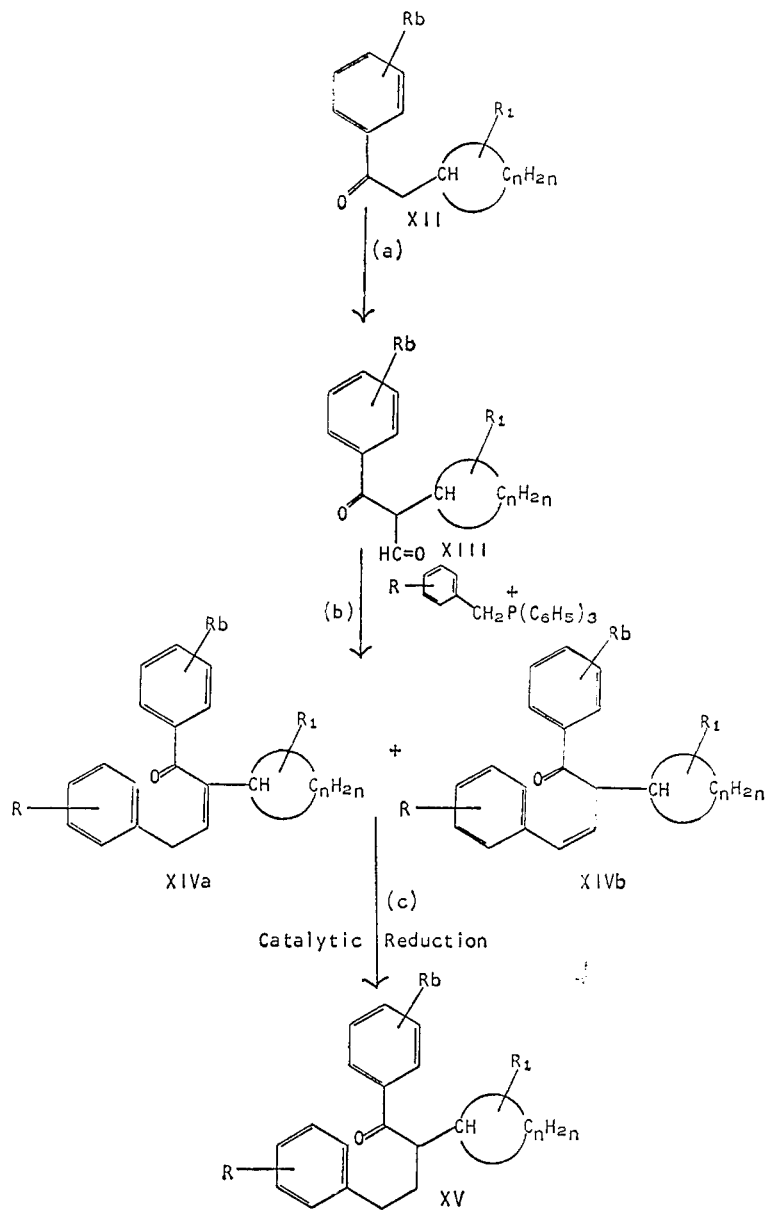

wherein $n$, R and $R_1$ are the same as above, and Rb is selected from the group consisting of hydrogen, alkyl, alkoxy and halogen.

The formylation step (a) is accomplished by treating the ketone (XII) with ethyl formate in the presence of a metal alkoxide. The ketone (XII) utilized in the formylation reaction can be prepared by standard procedures for preparing 2-substituted-acetophenones. The reaction is readily conducted at 25° C.; however, higher or lower temperatures may be used if desired. Step (b) represents a modified Wittig reaction. In the basic Wittig Reaction, the usual procedure involves reacting an ylide with an aldehyde. However, it has been found that high concentrations of the ylide, $(C_6H_5)_3P=CHAr$, adversely affect the reaction. For this reason, instead of using the ylide, the solid triphenylphosphonium salt is added to a mixture of the anion of the keto-aldehyde. Here again, a wide range of temperatures may be used, but it is preferably conducted under reflux conditions. Also, this reaction is preferably conducted in the presence of a solvent, i.e., tetrahydrofuran. The final step (c) involves the catalytic the isomeric mixture with hydrogen in the presence of a noble metal catalyst. For example, hydrogen may be bubbled thru a warm solution of the isomeric olefins in the presence of a palladium catalyst.

The cis isomers of the compound of Formula II, wherein $R_2$ is a substituted alkoxy group, are prepared in accordance with reaction scheme A, B, D, and E set forth in the flow sheet above.

In step A, the alkylated ketone of Formula III is dealkylated to yield the hydroxy ketone of Formula IV. This preferential dealkylation is accomplished by heating the alkylated ketone with three equivalents of aluminum chloride in benzene. The amount of aluminum chloride used is critical. It has been found that when less than three equivalents are used, the reaction does not proceed. Also, prolonged heating during this step should be avoided, because it results in a reduced yield. It is preferred to conduct the reaction under reflux conditions, although higher or lower temperatures may be used if desired.

In step B, the hydroxy ketone of Formula IV is cyclized to yield the hydroxy dihydronaphthalenes of Formula V.

This ring closure is effected in a solution consisting of a Lewis acid and a solvent such as benzene or toluene. The term "Lewis acid" is well known in the art and is defined succinctly by Fieser and Fieser, "Organic Chemistry," 3rd ed., page 138 (Reinhold, 1956). Examples of such compounds are hydrogen fluoride, boron trifluoride, arsenic trifluoride, phosphorus pentafluoride, toluene-sulfonic acid, titanium tetrafluoride, concentrated sulfuric acid, polyphosphoric acid and the like. Toluene sulfonic acid is the preferred acid because of the mildness of the reaction when it is used.

The cis hydroxy tetrahydronaphthalenes (VI) are prepared by reducing the dihydronaphthalenes of Formula IV as is illustrated in step D. The reduction can be effected by contact with hydrogen in the presence of a noble metal catalyst or by using a reducing agent such as lithium in the presence of an alkanol, for example methanol, ethanol, propanol, isobutyl alcohol tertiary butyl alcohol and the like, and liquid ammonia. When lithium in the presence of liquid ammonia is used as the reducing agent, the reduction can be carried out by adding an approximately stoichiometric amount of lithium advantageously in the form of lithium wire, to a solution of the dihydronaphthalene (V) in a mixture of liquid ammonia, an alcohol such as ethanol, methanol, isobutyl alcohol, and an inert organic solvent such as tetrahydrofuran or ether. The reduction occurs rapidly and is usually substantially complete in a period of from about 15 minutes to about 1 hour, though longer reaction periods may be necessary with certain compounds. The desired product VI is isolated from the reaction mixture by conventional procedures; for example, by evaporation of the solvent after addition of ammonium chloride, followed by solvent extraction of the residue, evaporation of solvent from the extraction, and purification of the resulting product by recrystallization or chromatography.

The hydroxy-tetrahydronaphthalenes (VI) can be readily converted to the ethers of Formula IIa by methods well known in the art for the etherification of phenols. Illustratively, the compounds of Formula IIa wherein $R'_2$ is lower alkyl can be prepared by treating the compounds of Formula V with the appropriate lower alkyl halide in the presence of a base such as sodium hydroxide, sodium methoxide and the like. The etherification is conducted advantageously in the presence of an organic solvent such as tetrahydrofuran, dioxane, or a lower alkanol, for example, methanol, ethanol, and isopropyl alcohol.

Using the same procedures as above but replacing the alkyl halide with a tertiaryaminoalkylhalide, compounds of Formula IIa wherein $R'_2$ is a tertiaryaminoalkoxy group can be prepared.

The carboxyalkyl and carbalkoxyalkyl ether compounds of Formula IIa wherein $R'_2$ is $—C_mH_{2m}—R_5$ (wherein $R_5$ and $C_mH_{2m}$ are as hereinbefore defined) can be prepared by reaction of the appropriate halo ester,

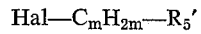

$$Hal—C_mH_{2m}—R_5'$$

wherein Hal represents halogen, preferably chlorine or bromine, and $R'_5$ is carbalkoxy, with an alkali-metal salt, preferably sodium or potassium salt, of the corresponding phenol (V). The reaction is carried out in the presence of an organic solvent such as tetrahydrofuran, dimethylformamide, benzene, toluene, xylene, and the like, using conditions conventional in the art for such alkylations. The carbalkoxyalkyl ether so obtained can be hydrolyzed to the corresponding free acid using procedures known in the art for hydrolysis of carboxylic acid esters, for example, by treatment with aqueous or alcoholic alkali-metal hydroxides.

Similarly the compounds of Formula IIa wherein $R'_2$ is an alkoxy group substituted by dihydroxyalkyl as hereinbefore defined, or by epoxyethyl, can be prepared by alkylating the corresponding compounds of Formula V with the appropriate dihydroxyalkyl halide or epoxyalkyl halide in the presence of a base such as sodium hydroxide, sodium methoxide, and the like. The alkylation is conducted advantageously in the presence of an organic solvent such as tetrahydrofuran, dioxane, a lower-alkanol, for example, methanol, ethanol, isopropyl alcohol, and the like.

The method for preparing trans- isomers of the compound of Formula II, wherein $R_2$ is a substituted alkoxy group, is illustrated by reaction scheme A, F, G, and H in the flow sheet above.

In reaction F, the ketone of Formula IV is reduced to yield the alcohol of Formula VII. This reduction is accomplished by reacting the ketone with lithium aluminum hydride in the presence of a solvent. The reaction proceeds readily at room temperature, but higher or lower temperatures may be used if desired. The preferred solvent is tetrahydrofuran; however, other solvents such as ether or dioxane or the like may be used. The ketone of Formula III has two asymmetric centers. Hence, it was surprising that the reduction yielded only a single diastereoismer. While the exact reason for this phenomena is not known, it is probably that the steric bulk of the groups on the carbon atom adjacent to the ketone group favor one mode of attack by the hydride. Reaction G is a cyclization and reaction H is an alkylation. These two reactions are conducted in substantially the same manner as reactions B and E respectively, both of which have been described above.

The dihydronaphthalenes of Formula I wherein $R_2$ is alkoxy or substituted alkoxy is prepared by the method illustrated by reaction scheme A, B, and C in the flow sheet above. Steps A and B have been described above. Step C involves a phenol alkylation, and it is performed in substantially the same manner as step E, which is described above. These alkylated dihydronaphthalenes may be converted to their corresponding tetrahydronaphthalene compounds by subjecting them to catalytic reduction.

The process for the preparation of dihydronaphthalenes of Formula I wherein $R_2$ is other than substituted alkoxy (Ib) is illustrated in reaction I in the flow sheet above.

The cis-isomers of the compounds of Formula II wherein $R_2$ is other than a substituted alkoxy group is prepared by reaction scheme I and J in the flow sheet above. Step I is a cyclization reaction and step J is a reduction reaction. They are preformed in substantially the same manner as the cyclization and reduction of reactions B and D respectively.

The method for preparing the trans-isomers of the compound of Formula II, wherein $R_2$ is a substituent other than substituted alkoxy, is illustarted in reaction schemes K and L. In reaction K, the ketone of Formula IX is subjected to a reduction to yield the carbinol of Formula XI. The carbinol is then cyclized to yield the compound of Formula IId. The ketone reduction and the cyclization reaction are conducteed in substantially the same manner as steps F and G respectively.

The acid addition salts of the invention comprise the salts of the basic compounds of Formulae I and II above with pharmacologically acceptably acids such as sulfuric, hydrochloric, nitric, phosphoric, lactic, benzoic, methane-sulfonic p-toluene-sulfonic, salicylic, acetic, propionic, maleic, malic, tartaric, citric, cyclohexanesulfamic, succinic, nicotinic, ascorbic acids, and the like.

The quaternary ammonium salts of the invention are the salts obtained by reacting the tertiary amino compounds of Formula I and II with quaternating agents, for example, alkyl halides, alkenyl halides, dialkyl sulfates, aralkyl halides, alkyl arylsulfonates, and the like. The term "alkyl" has the meaning hereinbefore defined. The term "alkenyl" means alkenyl from 3 to 8 carbon atoms, inclusive, such as allyl, 2-butenyl, 2-pentenyl, 2-hexenyl, 2-heptenyl, 2-octenyl, and isomeric forms thereof. The term "araykyl" means an aralkyl group containing from 7 to 13 carbon atoms, inclusive, such as benzyl, α-phenethyl, α-phenylpropyl, benzhydryl and the like. The term "alkyl arylsulfonates" means the esters formed from alkyl alcohols and arylsulfonic acids such as benzenesulfonic, toleuenesulfonic, xylenesulfonic, and the like acids. Examples of quaternary salts of the compounds of the invention are the methobromide, methiodide, ethobromide, propyl, chloride, butyl bromide, octyl bromide, methyl methosulfate, ethyl ethosulfate, allyl chloride, allyl bromide, benzyl bromide, benzhydryl chloride, methyl toluenesulfonate, ethyl toluenesulfonate and the like.

The novel compounds of the invention as defined above posses pharmacological activity in animals. Thus, the novel compounds of the invention are active as antifertility, estrogenic, anti-estrogenic and lipid normalizing agents. Illustratively, the compounds cis-2-cyclopentyl-1 - [p - (2,3 - dihydroxypropoxy)phenyl] - 6 - methoxy-1,2,3,4 - tetrahydronaphthalene, cis - 2 - cyclopentyl-6 - methoxy - 1 - [p - (2,N - pyrrolidinoethoxy)phenyl-1,2,3,4 - tetrahydronaphthalene hydrochloride, cis - 2-cyclopentyl - 1 - (p - hydroxyphenyl) - 6 - methoxy-1,2,3,4 - tetrahydronaphthalene and 2 - cyclopentyl - 6-methoxy - 1 - [p - 2,N - pyrrolidinoethoxy)phenyl]-3 - dihydronaphthalene hydrochloride exhibit oral antifertility activity in rats when tested by the method described by Duncan et al., Proc. Soc. Exp. Biol. Med. 112, 439–442, 1963.

The novel compounds of the invention are valuable for animal pest control. For example, the compounds of the invention are formulated in combination with baits and/or attractants and placed in feeding stations accessible to undesirable rodents and other small animals including Canedae such as coyotes, foxes, wolves, jackals, and wild dogs and birds such as starlings, gulls, redwing blackbirds, pigeons, and the like, thus reducing hazards to aviation by their presence on runways and in the vicinity of airfields, the spread of disease and destruction to property in both rural and urban areas.

For purposes of administration to birds and to mammals, including animals of economic value such as horses, cattle, sheep, pigs, mice, rats, rabbits and the like, the novel compounds of the invention can be combined with solid or liquid pharmaceutical carriers and formulated in the form of tablets, powder packets, capsules, and like solid dosage forms, using starch and like excipients, or dissolved or suspended in suitable solvents or vehicles, for oral or parenteral administration.

The following examples are set forth to illustrate my invention and to enable persons skilled in the art to better understand and practice the invention and are not intended to limit the same.

*Example 1.—2 - Cyclopentyl - 1 - (p-hydroxyphenyl)-4-(m-methoxyphenyl)-1-butanone*

(A) 2-CYCLOPENTYL-p-METHOXYACETOPHENONE

Solid aluminum chloride (53.2 g.) was added to an ice cooled mechanically stirred solution of 21.6 g. of anisole in 100 ml. of carbon disulfide. Over a period of 1 hour there was then added 29.2 g. of cyclopentylacetyl chloride. The resulting heavy paste was stirred for 3½ hours at room temperature and then poured onto a mixture of 200 ml. each of ice and concentrated hydrochloric acid. A small amount of ether was added and organic layer separated. The aqueous portion was extracted with two further portions of ether. The organic layers were combined and allowed to evaporate in the hood overnight. The residue was dissolved in ether and washed in turn with water, 5% aqueous sodium hydroxide, water and a saturated solution of sodium chloride. The oil which remained when the solvent was removed was distilled at 2 mm. $H_2$ to give 39.60 g. of 2 - cyclopentyl-p-methoxyacetophenone, B.P. 157–158° C. M.P. 30–31° C.

(B) m-METHOXYBENZYLTRIPHENYLPHOSPHONIUM CHLORIDE

A mixture composed of 44.16 g. of m-methoxybenzyl chloride and 74.0 g. of triphenylphosphine was heated in an oil bath at 100° C. for 1 hour. The resulting solid cake was broken up and recrystallized from a methylene chloride:acetonitrile solution. There was obtained 86.1 g. of m-methoxybenzyltriphenylphosphonium chloride, M.P. 271–272° C. The mother liquors were concentrated and allowed to cool. An additional 21.6 g. of product, M.P. 271–272° C. was obtained. (Total yield=91%).

*Analysis.*—Calcd. for $C_{26}H_{14}ClOP$ (percent): C, 74.15; H, 5.77; Cl, 8.47. Found (percent): C, 74.56; H, 6.01; Cl, 8.56.

Similarly, the para- and ortho-methoxybenzyltriphenylphosphonium chlorides are obtained by reacting the appropriate methoxybenzyl chloride with triphenylphosphine.

(C) 2-CYCLOPENTYL-3-(p-METHOXYPHENYL)-3-KETOPROPIONALDEHYDE

To an ice-cooled solution of 1.15 g. of sodium in 15 ml. of ethanol there was added 4.1 ml. of ethyl formate. The mixture was stirred until homogeneous and allowed to stand in the cold for 2 hours. Then 10.9 g. of solid 2 - cyclopentyl-p-methoxyacetophenone (step A) was added and the mixture stirred for 20 minutes in the cold and overnight at 25° C. The resulting syrup was poured into 250 ml. of ice water and extracted with ether. Evaporation of the organic layer afforded 8.76 g. of recovered starting ketone. The aqueous layer was then cautiously acidified in the cold and extracted with ether. The extract was washed with water and a saturated solution of sodium chloride and taken to dryness. The residual solid was recrystallized from a mixture of ether and Skellysolve B hexanes to give 1.30 g. of product, M.P. 116–120° C.

The corresponding ortho- and meta-methoxy isomers are obtained by employing the appropriate ortho- and meta-methoxy ketones in place of 2-cyclopentyl-p-methoxyacetophenone in the procedure of step C.

(D) 2-CYCLOPENTYL-4-(m-METHOXYPHENYL)-2-(p-METHOXYPHENYL)-1-BUTANONE

A solution of 4.93 g. of 2 - cyclopentyl - 3 - (p-methoxyphenyl) - 3 - ketopropionaldehyde (step C) in 200 ml. of tetrahydrofuran was treated with 0.86 g. of sodium hydride (56% in mineral oil). Following 20 minutes stirring at room temperature, 8.40 g. of m-methoxybenzyltriphenylphosphonium chloride was added, and the mixture stirred for 2 hours at room temperature (25° C.) and 2 hours at reflux. The reaction was then cooled in ice and treated with ether and water. The organic layer was washed with water and a saturated solution of sodium chloride and taken to dryness. The partly solid residue was chromatographed on 1 l. of magnesium silicate (Florisil) (elution with 10% acetone in Skellysolve B hexanes). The oily fractions which were similar by thin layer chromatography were combined to give 4.19 g. of a mixture of isomeric 2-cyclopentyl - 4 - (m-methoxyphenyl)-1-(p-methoxyphenyl)-1-butenones.

A mixture of the butenones and 0.40 g. of 10% palladium on charcoal in 200 ml. of ethanol was shaken under a hydrogen atmosphere. The theoretical amount of gas was taken up in 5 minutes. The catalyst was removed by filtration. The gum which remained when the filtrate was taken to dryness was chromatographed on 400 ml. of Florisil. The gummy fractions which had similar compositions, as shown by thin layer chromatography, were combined to give 3.75 g. of 2-cyclopentyl - 4 - (m-methoxyphenyl) - 1 - (p-methoxyphenyl) - 1 - butanone, NMR: AB pattern at 7.4; 1 $OCH_3$ at 3.85, 0 $OCH_3$ at 3.70, ratio of aromatic to aliphatic protons: Calcd.:1:2.5, found 1:2.6.

Similarly, other 2-cycloalkyl-1,4-diphenyl-1-butanones are obtained by reacting the appropriate 2-cycloalkyl-3-phenyl-3-ketopropionaldehyde with the appropriate triphenylphosphonium chlorides using the procedure described in step D.

(E) 2-CYCLOPENTYL-1-(p-HYDROXYPHENYL)-4-(m-METHOXYPHENYL)-1-BUTANONE

A mixture of 3.75 g. of 2-cyclopentyl-4-(m-methoxyphenyl)-1-(m-methoxyphenyl)-1-butanone (step D) and 4.25 g. of aluminum chloride in 100 ml. of benzene was heated at reflux for 4 hours. The mixture was allowed to cool, and 50 ml. of 2.5 N hydrochloric acid was added. The organic layer was separated, washed once with water, and extracted with six portions of 50 ml. each of N sodium hydroxide. The gum which precipitated when the alkaline extracts were acidified was taken up in ether. The last solution was taken to dryness and the residue chromatographed as Florisil. The gummy fractions were combined on the basis of thin layer chromatography to give 2.53 g. of 2-cyclopentyl - 1-(p-hydroxyphenyl)-4-(m-methoxyphenyl)-1-butanone; NMR: 1 exchangeable proton, 1 $OCH_3$.

Similarly, other derivatives of 1-(p-hydroxyphenyl)-2-cyclopentyl-4-phenyl-1-butanone are obtained by dealkylating the appropriate 2-cyclopentyl-1-(p-methoxyphenyl)-4-phenyl-1-butanones using the procedure described in step E.

*Example 2.—2-Cyclopentyl-1-(p-hydroxyphenyl)-6-methoxy-3,4-dihydronaphthalene*

A solution of 2.53 g. of 2-cyclopentyl-1-(p-hydroxyphenyl)-4-(m-methoxyphenyl)-1-butanone and 2.50 g. of toluene sulfonic acid in 100 ml. of benzene was heated at reflux for 4 hours. The solution was allowed to cool, diluted with ether, washed in turn with aqeuous sodium bicarbonate, water and a saturated solution of sodium chloride. The gum which remained when the solution was taken to dryness was chromatographed on 250 ml. of silica gel (elution with methylene chloride). The crystalline fractions were combined and recrystallized twice for Skellysolve B hexanes to yield 0.85 g. of crystalline 2-cyclopentyl - 1 - (p-hydroxyphenyl)-6-methoxy-3,4-dihydronaphthalene, M.P. 88–90° C.

*Analysis.*—Calcd. for $C_{22}H_{24}O_2$ (percent): C, 82.46; H, 7.55. Found (percent): C, 82.72; H, 8.48.

Other 2 - cycloalkyl - 1-(hydroxyphenyl)-3,4-dihydronaphthalene derivatives are obtained by replacing 2-cyclopentyl - 1 - (p-hydroxyphenyl)-4-(m-methoxyphenyl)-1-butanone with the appropriately substituted 2-cycloalkyl-1-(hydroxyphenyl)-4-phenyl-1-butanone in the procedure of Example 2. Representative of the dihydronaphthalenes so prepared are:

2-cyclopentyl-6-ethoxy-1-(p-hydroxyphenyl)-,
2-cyclopentyl-6-ethoxy-1-(o-hydroxyphenyl-,
2-cyclohexyl-1-(p-hydroxyphenyl)-6-methoxy-,
2-cyclohexyl-6-ethoxy-1-(p-hydroxyphenyl)-,
cyclohexyl-6-ethoxy-1-(o-hydroxyphenyl)-,
2-cyclopentyl-1-(p-hydroxyphenyl)-6-propoxy-,
2-cycolpentyl-6-cyclopropoxy-1-hydroxyphenyl-,
2-cyclopentyl-1-(o-hydroxyphenyl)-6-propoxy-,
6-butoxy-2-cyclopentyl-1-(p-hydroxyphenyl)-,
6-butoxy-2-cyclopentyl-1-(o-hydroxyphenyl)-3,4-dihydronaphthalenes The 1-(hydroxyphenyl)-3,4-dihydronaphthalenes so obtained are converted to the corersponding 1-(carbalkoxyalkoxyphenyl)-, and 1-(carboxyalkoxyphenyl)-, and 1-(alkoxyphenyl) derivatives thereof using the procedures set forth in Examples 8, 9, and 10 respectively.

*Example 3.—Cis-2-cyclopentyl-1-(p-hydroxyphenyl)-6-mehoxy-1,2,3,4-tetrahydronaphthalene*

A mixture of 4.65 g. of 2-cyclopentyl-1-(p-hydroxyphenyl)-6-methoxy-3,4-dihydronaphthalene and 0.46 g. of 10% palladium on charcoal was shaken under hydrogen until 1 equivalent of hydrogen was taken up (1 hour). The catalyst was collected on a filter and the filtrate taken to dryness. The residue was recrystallized from Skellysolve B hexanes to give 4.00 g. of cis-2-cyclopentyl-1-(p-hydroxyphenyl)-6-methoxy-1,2,3,4-tetrahydronaphthalene, M.P. 135–143° C.

*Analysis.*—Calcd. for $C_{22}N_{26}O_2$ (percent): C, 81.95; N, 8.13. Found (percent): C, 82.15; N, 8.57.

Similarly, using the procedure of Example 3 but replacing 2-cyclopentyl-1-(p-hydroxyphenyl)-6-methoxy-3,4-dihydronaphthalene by the 3,4-dihydronaphthalenes disclosed immediately after Example 2, there are obtained the corresponding 1,2,3,4-tetrahydronapthalenes.

*Example 4.—2-cyclopentyl-6-methoxy-1-[p-(2,N-pyrrolidinoethoxy)-phenyl]-3,4-dihydronaphthalene and hydrochloride thereof*

To a solution of 2.0 g. of 2-cyclopentyl-1-(p-hydroxyphenyl)-6-methoxy-3,4-dihydronaphthalene (Example 2) in 14 ml. of dimethylformamide and 70 ml. of benzene there was added 0.27 g. of sodium hydride (56% in mineral oil). Following 30 minutes stirring, 1.61 g. of 1:1 mixture of N-(β-chloroethyl)pyrrolidine and toluene was added, and the mixture brought to reflux. At the end of 17 hours, the mixture was allowed to cool and then mixed with an equal volume of ether and water. The organic fraction was separated and washed one time with water and one time with a saturated solution of sodium chloride. The aqueous fraction was backwashed with ether. Then the organic fractions were combined and taken to dryness to yield 3.80 g. of a gum containing 2-cyclopentyl-6-methoxy - 1-[p-(2,N-pyrrolidinoethoxy)-phenyl]-3,4-dihydronaphthalene. The hydrochloride was formed by dissolving the gum in ether and passing anhydrous hydrogen chloride through the ether solution. A soid precipitate came out of the solution upon seeding and it was fitered off to afford 3.85 g. of the crude product. This solid was recrystallized first from ethyl acetate and then from acetone. There was obtained 1.82 g. of solid 2-cyclopentyl-6-methoxy - 1 - [p - (2,N - pyrrolididoethoxy)phenyl]-3,4-dihydronaphthalene hydrochloride, melting point 206.5–208° C. (sintering at 190° C.).

*Analysis.*—Calc'd for $C_{28}H_{36}ClNO_2$ (percent): C, 74.06; H, 7.99; Cl, 7.81. Found (percent): C, 74.11; H, 8.14; Cl, 7.98.

*Example 5.—2-cyclopentyl-1-[p-(2,3-dihydroxypropoxy) phenyl]-6-methoxy-3,4-dihydronaphthalene*

To a solution of 2.76 g. 2-cyclopentyl-1-(p-hydroxyphenyl)-6-methoxy-3,4-dihydronaphthalene (Example 2) in 50 ml. of methanol and 2.04 ml. sodium methoxide there was added 1.01 g. of 1-chloro-2,3-propanediol. Following 18 hours heating under reflux and 48 hours stirring at room temperature, the mixture was taken to dryness. The residue was dissolved in a mixture of ether and water. The organic layer was separated, washed once with water and once with a saturated solution of sodium chloride. The aqueous layer was backwashed with ether. The organic fractions were combined and taken to dryness yielding 3.09 g. of a gummy residue. This residue was chromatographed on Florisil. Elution with 20% acetone gave the product as a series of amorphous gums: these were combined to give 1.69 g. of 2-cyclopentyl-[p-(2,3-dihydroxypropoxy)phenyl] - 6 - methoxy - 3,4 - dihydronaphthalene as an amorphous solid.

*Analysis.*—Calc'd. for $C_{25}H_{30}O_4$ (percent): C, 76.11; H, 7.67. Found (percent): C, 75.01; H, 8.73.

Using the above procedure but replacing 1-chloro-2,3-propanediol by 1-chloro-2,3-butanediol and 5-bromo-1,3-pentanediol there are obtained 2-cyclopentyl-1-[p-(2,3-dihydroxybutoxy)phenyl]- and 2-cyclopentyl-1-[p-(3,5-dihydroxypentyloxy)-phenyl]-6-methoxy - 3,4 - dihydronaphthalene respectively.

*Example 6.—Cis-2-cyclopentyl-6-methoxy-1 - [p - (2,N-pyrrolidinoethoxy) - phenyl]-1,2,3,4 - tetrahydronaphthalene and hydrochloride thereof*

One gram of cis-2-cyclopentyl-1-(p-hydroxyphenyl)-6-methoxy-1,2,3,5-tetrahydronaphthalene (Example 3) was dissolved in 7 ml. of dimethylformamide. Then 35 ml. of benzene and 0.14 g. of 56% sodium hydride were added. Following 1 hour stirring 1.61 g. of a 1:1 mixture of N-(β-chloroethyl)pyrrolidine and toluene was added, and the mixture brough to reflux. After refluxing for 18 hours, the mixture was cooled and then a volume of ether equal to the contents of the flask was added. The organic fraction was separated and washed once with water and once with a saturated solution of sodium chloride. The aqueous fraction was backwashed with ether. The organic fractions were combined and taken to dryness to yield 1.89 g. of a gummy residue which contained cis-2-cyclopentyl-6-methoxy-1-[p-(2,N - pyrrolidinoethoxy)phenyl] - 1,2,3,4 - tetrahydronaphthalene. The hydrochloride was formed by dissolving the gum in ether and passing anhydrous hydrogen chloride through the ether solution. A solid precipitate came out of the solution upon seeding and it was filtered off to afford 1.65 g. of the crude product. This solid was recrystallized from acetonitrile to give 1.06 g. of crystalline cis-2-cyclopentyl-6-methoxy-1[p-(2,N - pyrrolidinoethoxy)phenyl] - 1,2,3,4 - tetrahydronaphthalene hydrochloride, M.P. 237–240° C.

*Analysis.*—Calc'd for $C_{29}N_{39}CNO_2$ (percent): C, 73.74; H, 8.40; C, 7.78. Found (percent): C, 73.73; N, 8.68; C, 7.73.

Using the above procedure but replacing N-(β-chloroethyl)-pyrrolidine with N-(β-chloroethylpiperidine), N-(β-chloroethylpiperazine), N-(p-chloroethylmorpholine) there are obtained cis-2-cyclopentyl-6-methoxy-1-[p-(2,N-piperidineethoxy)phenyl-, cis-2-cyclopentyl-6-methoxy-1-[p-(2,N-piperazinoethoxy)phenyl]-and cis-2-cyclopentyl-6-methoxy - 1 - [p-(2,N-morpholinoethoxy)phenyl]-1,2,3,4-tetrahydronaphthalene hydrochlorides respectively.

*Example 7.—Cis-2-cyclopentyl - 1 - [p - (2,3 - dihydroxypropoxy)phenyl]-6-methoxy-1,2,3,4 - tetrahydronaphthalene*

To a solution of 3.00 g. of cis-2-cyclopentyl-1-(p-hydroxyphenyl)-6-methoxy-1,2,3,4-tetrahydronaphthalene in 55 ml. of methanol 2.30 ml. of sodium methoxide, there was added 1.13 g. of 1-chloro-2,3-propanediol. Following 18 hours heating under reflux, the mixture was taken to dryness. The residue was dissolved in a mixture of ether and water. The organic layer was separated and washed with water and a saturated solution of sodium chloride. The aqueous layer was backwashed with ether. Then the organic fractions were combined and taken to dryness yielding 3.61 g. of a gummy residue. This residue was chromatographed on Florisil. Elution with 20% acetone and then 50% acetone gave 2.04 g. of crude product. This product was recrystallized twice from cyclohexane to yield 1.53 g. of solid cis-2-cyclopentyl-1-[p-(2,3-dihydroxypropoxy)phenyl]-6-methoxy-1,2,3,4 - tetrahydronaphthalene, M.P. 103–105.5° C.

*Analysis.*—Calcd. for $C_{25}H_{32}O_4$ (percent): C, 75.72; H, 8.13. Found (percent): C, 75.94; H, 8.38.

Using the above procedure, but replacing 1-chloro-2,3-propanediol by 1-chloro-2,3-butanediol and 5-bromo-1,3-pentanediol there are obtained cis-1-[p-(2,3-dihydroxybutoxy)phenyl] - and cis-2-cyclopentyl-1-[p-(3,5-dihydroxypentyloxy)phenyl]-6-methoxy-1,2,3,4-tetrahydronaphthalene, respectively.

*Example 8.—Cis - ethyl-2-[p-(2-cyclopentyl-6-methoxy-1,2,3,4 - tetrahydro-1-naphthyl)phenoxy] - 2 - methylpropionate*

To a solution of 3.20 g. of cis-1-2-cyclopentyl-(p-hydroxyphenyl)-6-methoxy-1,2,3,4-tetrahydronaphthalene in 25 ml. of dimethylformamide and 75 ml. of benzene is added, with stirring, 0.43 g. of sodium hydride as a 53% suspension in mineral oil. When the effervescence has subsided, the solution is treated with a solution of 1.95 g. of ethyl 2-bromo-2-methylpropionate in 20 ml. of benzene and the mixture is heated under reflux for 18 hours. The resulting mixture is allowed to cool and then washed with a saturated solution of sodium chloride. The organic layer is separated and evaporated to dryness. The residue is chromatographed on a column of Florisil and the column is eluted with petroleum ether containing increasing proportions of acetone. Those fractions which, on the basis of infrared absorption analysis are found to contain the desired product, are combined and evaporated to dryness. The residue is distilled evaporatively at high vacuum to yield cis-ethyl 2-[p-(2-cyclopentyl-6-methoxy-1,2,3,4-tetrahydro-1-naphthyl)phenoxy]-2-methylpropionate.

Similarly, using the above procedure, but replacing ethyl 2-bromo-2-methylpropionate by ethyl bromoacetate, ethyl 2-bromovalerate, and methyl 2-bromocaprate, there are obtained cis-ethyl-[p-(2-cyclopentyl-6-methoxy-1,2,3,4-tetrahydro-1-naphthyl)phenoxy]acetate, cis ethyl-2-[p-(2 - cyclopentyl - 6 - methoxy - 1,2,3,4 - tetrahydro - 1-naphthyl)phenoxy]valerate, and cis methyl-2-[p-(2-cyclopentyl - 6 - methoxy - 1,2,3,4 - tetrahydro - 1 - naphthyl)phenoxy]caprate, respectively.

*Example 9.—Cis-2-[p-(2-cyclopentyl-6-methoxy-1,2,3,4-tetrahydro-1-naphthyl)phenoxy]-2-methylpropionic acid*

A solution of 3.0 g. of cis-ethyl 2-[p-(2-cyclopentyl-2-methoxy-1,2,3,4-tetrahydro-1 - naphthyl)phenoxy] - 2-methylpropionate (prepared as described in Example 8) and 6 ml. A 50% aqueous potassium hydroxide in 100 ml. of methanol is heated under reflux for 5 hours. The reaction mixture is then evaporated to dryness and the residue is suspended in water and made strongly acidic by the addition of 2.5 N hydrochloric acid. The solid which separates is isolated by filtration and recrystallized twice from aqueous methanol to yield cis-2-[p-(2-cyclopentyl-6-methoxy-1,2,3,4-tetrahydro-1 - naphthyl)phenoxy] - 2-methylpropionic acid.

Using the same procedure, cis-p-(2-cyclopentyl-6-methoxy-1,2,3,4-tetradhydro-1-naphthyl)phenoxy - acetic acid, cis-2-[p-(2-cyclopentyl-6-methoxy-1,2,3,4-tetrahydro - 1-naphthyl)phenoxy] valeric acid and cis-2-[p-(2-cyclopentyl-6-methoxy-1,2,3,4-tetrahydro - 1 - naphthyl)phenoxy]capric acid, respectively, are obtained from the corresponding ethyl and methyl esters (prepared as described in Example 8).

*Example 10.—Cis-2-cyclopentyl-6-methoxy-1-(p-methoxyphenyl)-1,2,3,4-tetrahydronaphthalene*

Using the procedure described in Example 7, but replacing 1-chloro-2,3-propanediol by methyl iodide and reducing the reaction time to 2 hours there is obtained cis-2-cyclopentyl-6-methoxy-1-(p - methoxyphenyl) - 1,2,3,4-tetrahydronaphthalene.

*Example 11.—Trans-1-(p-hydroxyphenyl)-2-phenyl-6-methoxy-1,2,3,4-tetrahydronaphthalene*

(A) 1-(p-HYDROXYPHENYL)-2,4-(m-METHOXYPHENYL)-PHENYL-1-BUTANOL

A solution of 5.0 g. of 2-cyclopentyl-1-(p-hydroxyphenyl)-4-(m-methoxyphenyl)-1-butanone in 100 ml. of tetrahydrofuran was added to 1.0 g. of lithium aluminum hydride in 10 ml. of tetrahydrofuran over a period of ten minutes. Following 2 hours stirring at 25° C., the mixture was cooled in ice and 20 ml. of each of saturated aqueous amomnium chloride and water were added. The inorganic gel was removed by filtration through Super Cel (infusorial earth). The organic layer was diluted with ether, washed with water and a saturated solution of sodium chloride and taken to dryness. The residue was recrystallized twice from a mixture of ether and Skellysolve B hexanes to give 1-(p-hydroxyphenyl)-4-methoxyphenyl-2-phenyl-1-butanol.

(B) 2-CYCLOPENTYL-1-(p-HYDROXYPHENYL)-6-METHOXY-1,2,3,4-TETRAHYDRONAPHTHALENE

A solution of 5.0 g. of 2-cyclopentyl-1-(p-hydroxyphenyl)-4-(m-methoxyphenyl)-1-butanol (step A) and 2.5 g. of p-toluenesulfonic acid in 200 ml. of benzene was heated for 2 hours under a Dean-Stark trap. The solution was allowed to cool and then it was washed successively wih aqueous sodium bicarbonate and a saturated solution of sodium chloride. The solution was taken to dryness and the residue chromatographed over silica gel (elution with methylene chloride). Those fractions which were similar by thin layer chromatography were combined and chromatographed over Florisil (elution wtih increasing proportions of acetone in Skellysolve B hexanes). Those fractions which crystilized on trituration with ether were combined and recrystallized twice from ether. There was obtained trans-2-cyclopentyl-1-(p-hydroxyphenyl)-6-methoxy - 1,2,3,4-tetrahydronaphthalene.

Similarly, using the procedure described in step B above, but replacing 1-(p-hydroxyphenyl)-2-cyclopentyl-4 - (m-methoxyphenyl)-1-butanol by the appropriately substituted 2-cycloalkyl-1-(hydroxyphenyl)-4-phenyl - 1 - butanol is productive of the corresponding trans-2-cycloalkyl-1-(hydroxphenyl) substituted 1,2,3,4 - tetrahydronaphthalenes. Representative of the trans-isomers so obtained are those that correspond to the 3,4-dihydronaphthalenes that are disclosed immediately after Example 2.

The trans-2-cyclopentyl-1-(hydroxyphenyl) - 1,2,3,4-tetrahydronaphthalenes can be etherified according to the procedures set forth in Examples 6 through 10 to produce the corresponding 1-(tertiaryaminoalkoxyphenyl)-, 1-(dihydroxyalkoxyphenyl)-, 1-(carbalkoxyalkoxyphenyl)-, 1-(carboxyalkoxyphenyl)-, 1-(alkoxyphenyl)-, derivatives thereof.

*Example 12.—2-cyclopentyl-6-methoxy-1-phenyl-3,4-dihydronaphthalene*

Using the procedure described in Example 2, but replacing 2-cyclopentyl-1-(p-hydroxyphenyl)-4-(m - methoxyphenyl)-1-butanone by 2-cyclopentyl-4 - (m - methoxyphenyl)-1-phenyl-1-butanone there is obtained 2 - cyclopentyl-6-methoxy-1-pentyl-3,4-dihydronaphthalene.

Similarly, using the procedure described in Example 2, but replacing 2-cyclopentyl - 1 - (p-hydroxyphenyl) - 4-(m-methoxyphenyl)-1-butanone by the appropriately substituted 4 - (alkoxyphenyl) - 2 - cycloalkyl - 1 - phenyl-1-butanone is productive of the corresponding 3,4-dihydronaphthalenes. Representative of the 3,4-dihydronaphthalenes so prepared are:

1-(p-chlorophenyl-2-cyclopentyl-6-methoxy-,
2-cyclopentyl-6-methoxy-1-(p-methylphenyl)-,
2-cyclopentyl-1-(p-ethylphenyl)-6-methoxy-,
1-(p-chlorophenyl)-2-cyclopentyl-7-methoxy-,
1-(m-chlorophenyl)-2-cyclopentyl-6-methoxy-,
6-methoxy-2-(3-methylcyclopentyl)-1-phenyl-,
2-(3-ethylcyclopentyl)-6-methoxy-1-phenyl-,
1-(p-bromophenyl)-2-cyclopentyl-6-methoxy-,
1-(p-bromophenyl)-2-cyclopentyl-8-methoxy-,
1-(o-chlorophenyl)-2-cyclopentyl-6-methoxy-3,4-dihydronaphthalenes.

*Example 13.—Cis-1-phenyl-2-cyclopentyl-6-methoxy-1,2,3,4-tetrahydronaphthalene*

Using the procedure of Example 3, but replacing 2-cyclopentyl - 1 - (p - hydroxyphenyl) - 6 - methoxy-3,4-dihydronaphthalene by 2-cyclopentyl - 6 - methoxy - 1-phenyl - 3,4 - dihydronaphthalene there is obtained cis-2-cyclopentyl-6-methoxy-1-phenyl-1,2,3,4 - tetrahydronaphthalenes.

Similarly, using the procedure of Example 3, but replacing 2-cyclopentyl - 1 - (p-hydroxyphenyl)-6-methoxy-3,4-dihydronaphthalene by the 3,4-dihydronaphthalenes disclosed immediately after Example 12, there are obtained the corresponding 1,2,3,4-tetrahydronaphthalenes.

*Example 14.—Trans-2-cyclopentyl-6-methoxy-1-phenyl-1,2,3,4-tetrahydronaphthalene*

Using the procedure described in Example 11 but replacing 2-cyclopentyl - 1 - (p - hydroxyphenyl) - 4 - (m-methoxyphenyl) - 1 - butanone by 2-cyclopentyl - 4 - (m-methoxyphenyl)-1-phenyl-1-butanone there is obtained trans - 2 - cyclopentyl - 6 - methoxy - 1 - phenyl - 1,2,3,4-tetrahydronaphthalene.

Similarly, by using the procedure described in Example 11 but replacing 2-cyclopentyl-1-(p-hydroxyphenyl)-4-(methoxyphenyl)-butanone by the appropriately substituted 2-cyclopentyl - 1 - phenyl - 4 - phenyl-butanone, the corresponding trans-1,2,3,4 - tetrahydronaphthalenes are obtained. Representative of the tetrahydronaphthalenes so obtained are the trans-isomers that correspond to the 3,4-dihydronaphthalenes set forth in Example 12.

I claim:
1. A compound having the formula

(A)

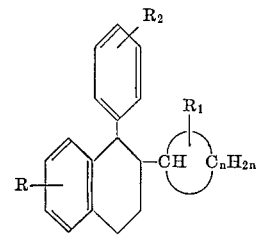

wherein R represents alkoxy of from 1 to 4 carbon atoms, inclusive, or cycloalkoxy of from 3 to 6 carbon atoms, inclusive; $R_1$ represents hydrogen, and alkyl of from 1 to 4 carbon atoms, inclusive; and $R_2$ is selected from the class consisting of hydrogen, alkyl of from 1 to 4 carbon atoms, inclusive, hydroxy, halogen, alkoxy of from 1 to 4 carbon atoms, inclusive, alkoxy of from 1 to 4 carbon atoms, inclusive, substituted by a group selected from the class consisting of (a) dihydroxyalkyl, having from 2 to 5 carbon atoms, inclusive, (b) a group having the structure

wherein $R_3$ and $R_4$ individually are similar or different alkyl groups of from 1 to 4 carbon atoms, inclusive, and when taken together with the attached nitrogen atom form the residue of a saturated heterocyclic amine selected from the group consisting of pyrrolidino, alkylpyrrolidino, piperazino, alkylpiperazino, piperidino, alkylpiperidino, morpholino, hexamethylenimino and homopiperazino wherein the alkyl groups attached to the heterocyclic amine contain from 1 to 4 carbon atoms, inclusive, and (c) the radical —$C_mH_{2m}$—$R_5$ wherein $m$ is an integer from 1 to 6, inclusive, and $R_5$ is selected from the group consisting of carboxy and —COOAlkyl, wherein Alkyl is alkyl as hereinbefore defined, and $n$ is 4 or 5. (B) The addition salts with pharmacologically acceptable acids of those compounds of the above formulae wherein $R_2$ contains an amino substituent; (C) the quaternary ammonium salts of compounds of the above formulae wherein $R_2$ contains a tertiary amino substituent and wherein the moiety attached to the tertiary amino radical is selected from the group consisting of alkyl of from 1 to 4 carbon atoms, inclusive, alkenyl of from 3 to 8 carbon atoms, inclusive, and aralkyl of from 7 to 13 carbon atoms, inclusive.

2. A compound of claim 1 having the formula of (II).
3. The cis-isomers of the compound of claim 2.
4. The trans-isomers of the compound of claim 2.
5. A compound of claim 3 wherein R is 6-methoxy, $R_1$ is hydrogen, and $R_2$ is para-hydroxy.
6. A compound of claim 3 wherein R is 6-methoxy, $R_1$ is hydrogen and $R_2$ is para-(2,3-dihydroxypropoxy).

7. A compound of claim 3 wherein R is 6-methoxy, $R_1$ is hydrogen and $R_2$ is para-(2,N-pyrrolidinoethoxy).

8. The hydrochloride salt of a compound of claim 2 having the formula of (II) wherein R is 6-methoxy, $R_1$ is hydrogen and $R_2$ is para(2,N-pyrrolidinoethoxy).

9. The process for preparing a compound having the formula:

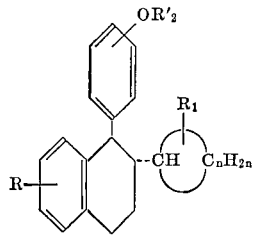

wherein R represents alkoxy of from 1 to 4 carbon atoms, inclusive, or cycloalkoxy of from 3 to 6 carbon atoms, inclusive, wherein $R_1$ represents hydrogen or lower alkyl; and $R'_2$ is selected from the class consisting of hydrogen, alkyl of from 1 to 4 carbon atoms, inclusive, alkyl of from 1 to 4 carbon atoms, inclusive substituted by a group selected from the class consisting of (a) dihydroxyalkyl, having from 2 to 5 carbon atoms, inclusive, (b) a group having the structure

wherein $R_3$ and $R_4$ individually are similar or different alkyl groups of from 1 to 4 carbon atoms, inclusive, and when taken together with the attached nitrogen atom form the residue of a saturated heterocyclic amine selected from the group consisting of pyrrolidino, alkylpyrrolidino, piperazino, alkylpiperazino, piperidino, alkylpiperidino, morpholino, hexamethylenimino and homopiperazino wherein the alkyl groups attached to the heterocyclic amine contain from 1 to 4 carbon atoms, inclusive, and (c) the radical —$C_mH_{2m}$—$R_5$ wherein $m$ is an integer from 1 to 6, inclusive, and $R_5$ is selected from the group consisting of carboxy and —COOAlkyl, wherein Alkyl is alkyl as hereinbefore defined, and $n$ is 4 or 5 which comprises:

(I) heating, in the presence of a solvent, a compound having the formula:

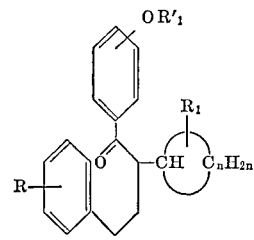

with three equivalents of aluminum chloride to form a ketone having the formula:

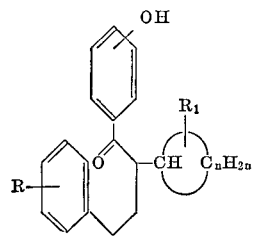

wherein R and $R_1$ are the same as above and $R'_1$ is alkyl containing from 1 to 4 carbon atoms, inclusive;

(II) reacting the ketone with lithium aluminum hydride in the presence of a solvent to form the corresponding carbinol (III) cyclizing the carbinol by reacting it with a solution of a Lewis acid and (IV) alkylating, in the presence of a base, the product of the cyclization reaction with a compound having the formula $$R'_2-X$$

wherein $R'_2$ is the same as above and X is halogen.

References Cited
UNITED STATES PATENTS 3,234,211   2/1966   Huebner et al. _____ 260—239

NICHOLAS S. RIZZO, Primary Examiner

J. A. NARCAVAGE, Assistant Examiner

U.S. Cl. X.R.

260—239, 247.7, 268, 294.7, 570.7, 590, 592, 612, 613, 619, 999

UNITED STATES PATENT OFFICE
CERTIFICATE OF CORRECTION

Patent No. 3,567,737                     Dated  March 2, 1971

Inventor(s)    Daniel Lednicer

It is certified that error appears in the above-identified patent and that said Letters Patent are hereby corrected as shown below:

Column 1, line 40, "$R_1$" should read -- $R_2$ --. Column 11 line 1, "araykyl" should read -- aralkyl --; line 24, "pyrrolidinoethoxy)" should read -- pyrrilidinoethoxy) --. C 13, line 40, "for" should read -- from --; line 71, "mehoxy" should read -- methoxy --. Column 14, line 35, "soid" should read -- solid --; line 40, "pyrrolididoethoxy" should read -pyrrolidinoethoxy --. Column 17, line 42, "1-pentyl-" should read -- 1-phenyl- --. Column 18, lines 68 and 69, cancel "2. compound of claim 1 having the formula of (II)."; lines 70 a 71, claim reference numeral "2", each occurrence, should rea -- 1 --; lines 72 and 74, and column 19, line 1, claim refer numeral "3", each occurrence, should read -- 7 --. Column 19 3, "claim 2 having the formula of (II) wherein R is" shou read -- claim 1 wherein R is --. claims numbered 3 through should be renumbered 2 through 8, respectively. In the headi to the printed specification, line 10, "9 Claims." should re -- 8 Claims.--.

Signed and sealed this 7th day of December 1971.

(SEAL)
Attest:

EDWARD M.FLETCHER,JR.                ROBERT GOTTSCHALK
Attesting Officer                    Acting Commissioner of Pat